(12) United States Patent
Sarantis

(10) Patent No.: US 6,739,287 B1
(45) Date of Patent: May 25, 2004

(54) DOG TOY AND TOOTHBRUSH SYSTEM AND METHOD

(76) Inventor: Dimitrios Sarantis, 250 Cypress La., Oldsmar, FL (US) 34677

( * ) Notice: Subject to any disclaimer, the term of this patent is extended or adjusted under 35 U.S.C. 154(b) by 0 days.

(21) Appl. No.: 10/424,668

(22) Filed: Apr. 28, 2003

(51) Int. Cl.$^7$ ................................................. A01K 29/00
(52) U.S. Cl. ....................................... 119/709; 119/702
(58) Field of Search ................................ 119/709, 707, 119/710, 702, 711, 706; D30/160

(56) References Cited

U.S. PATENT DOCUMENTS

| | | | | | |
|---|---|---|---|---|---|
| 2,003,958 A | * | 6/1935 | Salisbury | ................... | 119/709 |
| 5,149,550 A | * | 9/1992 | Mohilef | ........................ | 426/3 |
| 5,174,243 A | * | 12/1992 | O'Rourke | .................. | 119/709 |
| D337,398 S | * | 7/1993 | Axelrod | ..................... | D30/160 |
| 5,263,436 A | * | 11/1993 | Axelrod | ..................... | 119/710 |
| 5,273,425 A | * | 12/1993 | Hoagland | ...................... | 433/1 |
| D343,262 S | * | 1/1994 | Axelrod | ..................... | D30/160 |
| 5,485,809 A | * | 1/1996 | Carroll | ........................ | 119/710 |
| 5,832,877 A | * | 11/1998 | Markham | .................... | 119/710 |
| 5,944,516 A | * | 8/1999 | Deshaies | ....................... | 433/1 |
| 6,116,191 A | * | 9/2000 | Suchowski et al. | ......... | 119/709 |
| 6,405,681 B1 | * | 6/2002 | Ward | .......................... | 119/707 |

* cited by examiner

*Primary Examiner*—Charles T. Jordan
*Assistant Examiner*—Judith A. Nelson
(74) *Attorney, Agent, or Firm*—Edward P. Dutkiewicz

(57) ABSTRACT

A plurality of elongated support members are curved in an arcuate configuration. In this manner an interior concave face and an exterior convex face are formed. Each support member resides in a plane with a first end and a second end and with a central extent there between. A plurality of bristles is provided. The first ends of the support members are coupled together and the second ends of the support members are coupled together.

7 Claims, 2 Drawing Sheets

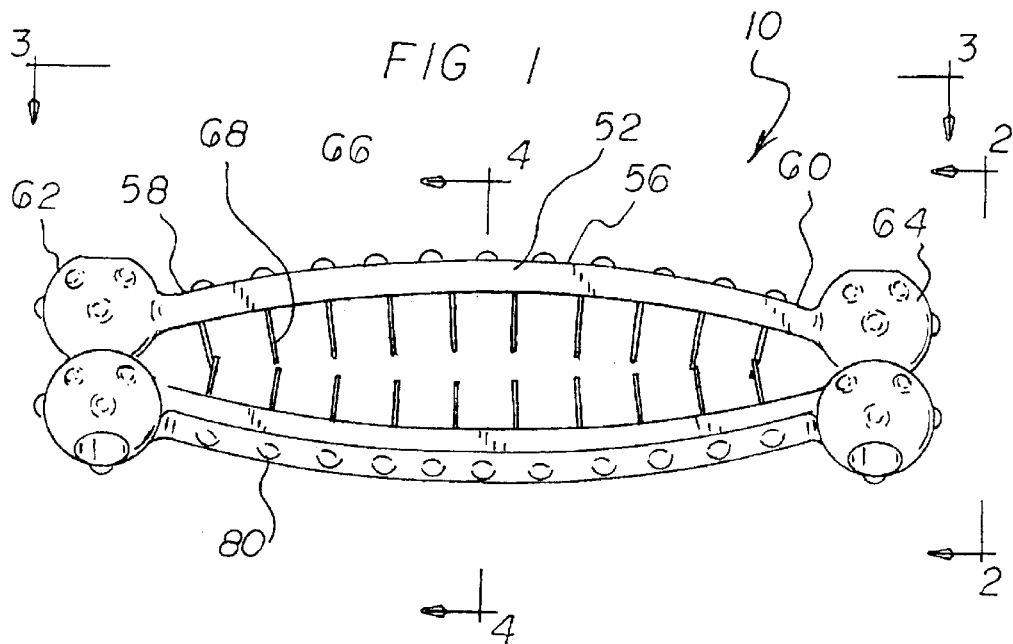
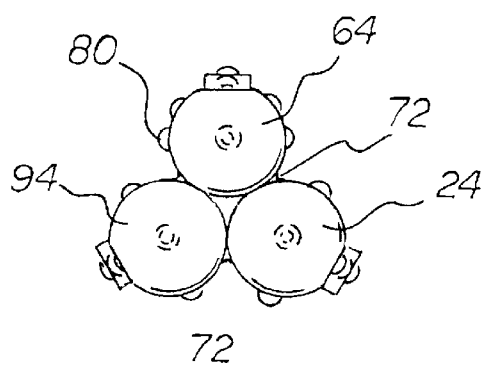

DOG TOY AND TOOTHBRUSH SYSTEM AND METHOD

BACKGROUND OF THE INVENTION

1. Field of the Invention

The present invention relates to a dog toy and toothbrush system and method and more particularly pertains to providing dental hygiene as well as concurrent entertainment to a dog.

2. Description of the Prior Art

The use of dental hygiene methods and apparatuses for dogs is known in the prior art. More specifically, dental hygiene methods and apparatuses for dogs previously devised and utilized for the purpose of providing dental hygiene to dogs through known methods and apparatuses are known to consist basically of familiar, expected, and obvious structural configurations, notwithstanding the myriad of designs encompassed by the crowded prior art which has been developed for the fulfillment of countless objectives and requirements.

| Patent No. | Issue Date | Inventor | Title |
| --- | --- | --- | --- |
| 5,249,961 | Oct. 5, 1993 | Hoagland | Portable Pet Teeth-Cleaning Abrasive Instrument |
| 5,263,436 | Nov. 23, 1993 | Axelrod | Bone-shaped Therapeutic Device for Dogs |
| 5,273,425 | Dec. 28, 1993 | Hoagland | Portable Pet Teeth Cleaning Abrasive Instrument |

While these devices fulfill their respective, particular objectives and requirements, the aforementioned patents do not describe a dog toy and toothbrush system and method that allows providing dental hygiene as well as concurrent entertainment to a dog.

In this respect, the dog toy and toothbrush system and method according to the present invention substantially departs from the conventional concepts and designs of the prior art, and in doing so provides an apparatus primarily developed for the purpose of providing dental hygiene as well as concurrent entertainment to a dog.

Therefore, it can be appreciated that there exists a continuing need for a new and improved dog toy and toothbrush system and method which can be used for providing dental hygiene as well as concurrent entertainment to a dog. In this regard, the present invention substantially fulfills this need.

SUMMARY OF THE INVENTION

In view of the foregoing disadvantages inherent in the known types of dental hygiene methods and apparatuses for dogs now present in the prior art, the present invention provides an improved dog toy and toothbrush system and method. As such, the general purpose of the present invention, which will be described subsequently in greater detail, is to provide a new and improved dog toy and toothbrush system and method which has all the advantages of the prior art and none of the disadvantages.

To attain this, the present invention essentially comprises a first elongated support member. The first support member is fabricated of an essentially rigid polymeric. The rigid polymeric is a non-toxic, non-abrasive and easy to clean material. The first support member is of a long and thin shape. The first support member is curved in an arcuate configuration. In this manner an interior concave face and an exterior convex face are formed. The first support member resides in a first plane. The first support member has a first end and a second end. A central extent is provided between the first and second ends. The first support member also has a first ball at the first end and second ball at the second end. Each of the balls has a diameter greater than the largest cross sectional dimension of the first support member. A plurality of tufts of bristles is coupled to the first support member. Each tuft has an inner end and an outer end. The inner end is coupled to the first support member. The outer end extends away from the first support member.

A second elongated support member is provided. The second support member is fabricated of an essentially rigid polymeric material. The second support member is of a long and thin shape. The second support member is curved in an arcuate configuration. In this manner an interior concave face and an exterior convex face are formed. The second support member resides in a second plane. The second support member has a first end and a second end. A central extent is provided between the first and second ends. The second support member also has a first ball at the first end and second ball at the second end. Each of the balls have a diameter greater than the largest cross sectional dimension of the second support member. A plurality of tufts of bristles is coupled to the second support member. Each tuft has an inner end and an outer end. The inner end is coupled to the second support member. The outer end extends away from the second support member.

A third elongated support member is provided next. The third support member is fabricated of an essentially rigid polymeric material. The third support member is of a long and thin shape. The third support member is curved in an arcuate configuration. In this manner an interior concave face and an exterior convex face are formed. The second support member resides in a third plane. The third support member has a first end and a second end. A central extent is provided between the first and second ends. The third support member also has a first ball at the first end and second ball at the second end. Each of the balls has a diameter greater than the largest cross sectional dimension of the second support member. A plurality of tufts of bristles is coupled to the third support member. Each tuft has an inner end and an outer end. The inner end is coupled to the third support member. The outer end extends away from the third support member. There are preferably three support members. Each support member is in a plane different than the other support members. The planes are at about 120 degrees with respect to each other.

Provided next is a first adhesive. The first adhesive couples together the first balls of the first, second and third elongated members. In this manner each first ball contacts the other first balls. In an alternate embodiment of the invention, the members and balls are molded into a single unit.

A second adhesive is provided. The second adhesive couples together the second balls of the first, second and third elongated members. In this manner each second ball contacts the other second balls. The system is preferably configured whereby the tufts of bristles of the various support members are in contact with each other and adjacent to the ends of the support members but spaced from each other adjacent to the central extents of the support members.

Further provided is a plurality of generally hemispherical projections. The projections are on the exterior face of the supporting member. The projections are also on the balls to massage the gums of a dog chewing on the system.

Provided last is a dentifrice. The dentifrice is preferably an enzymatic toothpaste. The dentifrice is provided on the outer ends of the bristles. In this manner the dental cleansing action is enhanced on teeth of a dog chewing, with a brushing motion, on the system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dog toy and toothbrush system and method which has all of the advantages of the prior art dental hygiene methods and apparatuses for dogs and none of the disadvantages.

It is another object of the present invention to provide a new and improved dog toy and toothbrush system and method which may be easily and efficiently manufactured and marketed.

It is further an object of the present invention to provide a new and improved dog toy and toothbrush system and method which is of durable and reliable constructions.

An even further object of the present invention is to provide a new and improved dog toy and toothbrush system and method which is susceptible of a low cost of manufacture with regard to both materials and labor, and which accordingly is then susceptible of low prices of sale to the consuming public, thereby making such dog toy and toothbrush system and method economically available to the buying public.

Even still another object of the present invention is to provide a dog toy and toothbrush system and method for providing dental hygiene as well as concurrent entertainment to a dog.

Lastly, it is an object of the present invention to provide a new and improved dog toy and toothbrush system and method. A plurality of elongated support members are curved in an arcuate configuration. In this manner an interior concave face and an exterior convex face are formed. Each support member resides in a plane with a first end and a second end and with a central extent there between. A plurality of bristles is provided. The first ends of the support members are coupled together and the second ends of the support members are coupled together.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the dog toy and toothbrush system constructed in accordance with the principles of the present invention.

FIG. 2 is a side elevational view of the system shown in FIG. 1 taken along line 2—2 of FIG. 1.

The same reference numerals refer to the same parts throughout the various Figures.

DESCRIPTION OF THE PREFERRED EMBODIMENT

Figure 3:
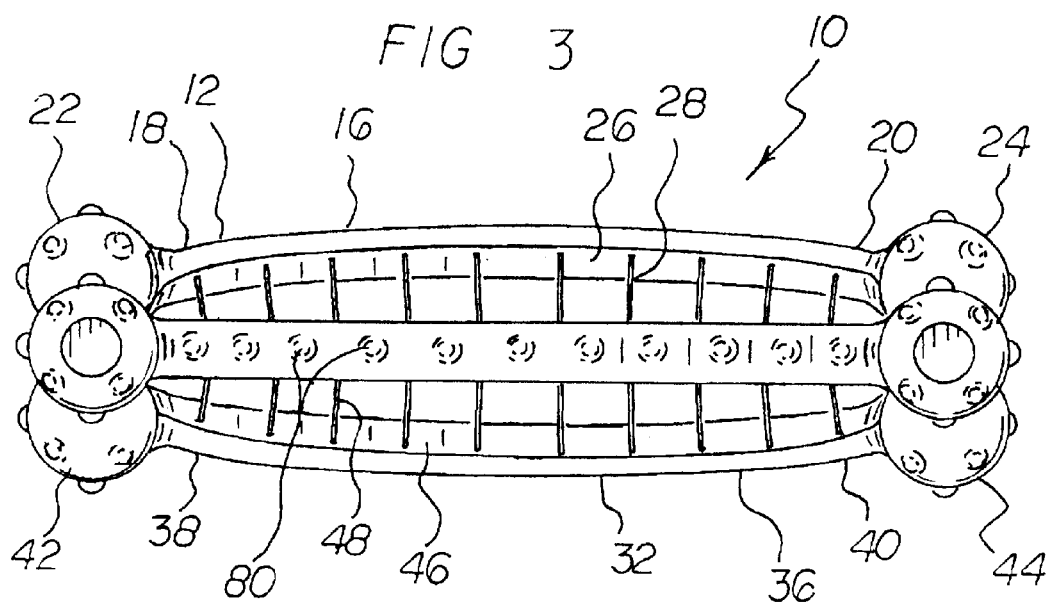
FIG. 3 is a plan view of the system showing FIGS. 1 and 2 taken along line 3—3 of FIG. 1.
Figure 4:
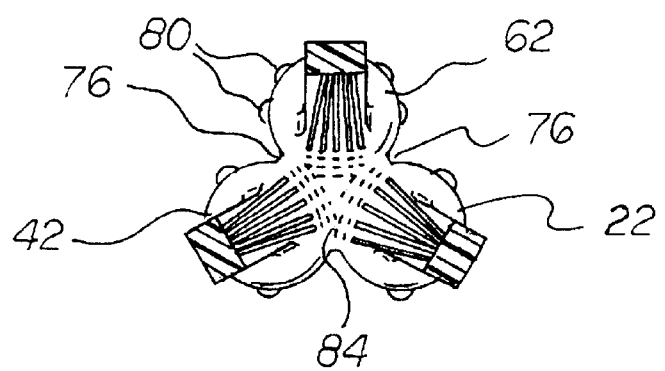
FIG. 4 is cross sectional view taken along line 4—4 of FIG. 1.

With reference now to the drawings, and in particular to FIG. 1 thereof, the preferred embodiment of the new and improved dog toy and toothbrush system embodying the principles and concepts of the present invention and generally designated by the reference numeral 10 will be described.

The present invention, the dog toy and toothbrush system 10 is comprised of a plurality of components. Such components in their broadest context include a plurality of support members and first ends. Such components are individually configured and correlated with respect to each other so as to attain the desired objective.

First provided is a first elongated support member 12. The first support member is fabricated of an essentially rigid polymeric. The rigid polymeric is a non-toxic, non-abrasive and easy to clean material. The first support member is of a long and thin shape. The first support member is curved in an arcuate configuration. In this manner an interior concave face 14 and an exterior convex face 16 are formed. The first support member resides in a first plane. The first support member has a first end 18 and a second end 20. A central extent is provided between the first and second ends. The first support member also has a first ball 22 at the first end and second ball 24 at the second end. Each of the balls has a diameter greater than the largest cross sectional dimension of the first support member. A plurality of tufts of bristles 28 are coupled to the first member. Each tuft has an inner end and an outer end. The inner end is coupled to the first member. The outer end extends away from the first strip and the first support member.

A second elongated support member 32 is provided. The second support member is fabricated of an essentially rigid polymeric material. The second support member is of a long and thin shape. The second support member is curved in an arcuate configuration. In this manner an interior concave face 34 and an exterior convex face 36 are formed. The second support member resides in a second plane. The second support member has a first end 38 and a second end 40. A central extent is provided between the first and second ends. The second support member also has a first ball 42 at the first end and second ball 44 at the second end. Each of the balls have a diameter greater than the largest cross sectional dimension of the second support member. A plurality of tufts of bristles 48, preferably fabricated of a polymer, is coupled to the second support member. Each tuft has an inner end and an outer end. The inner end is coupled to the second strip. The outer end extends away from the second strip and the second support member.

A third elongated support member 52 is provided next. The third support member is fabricated of an essentially rigid polymeric material. The third support member is of a long and thin shape. The third support member is curved in an arcuate configuration. In this manner an interior concave face 54 and an exterior convex face 56 are formed. The second support member resides in a third plane. The third support member has a first end 58 and a second end 60. A central extent is provided between the first and second ends. The third support member also has a first ball 62 at the first end and second ball 64 at the second end. Each of the balls has a diameter greater than the largest cross sectional dimension of the second support member. A plurality of tufts of bristles 68 is coupled to the third support member. Each tuft has an inner end and an outer end. The inner end is coupled to the third support member. The outer end extends away from the third support member. There are preferably three support members. Each support member is in a plane different than the other support members. The planes are at about 120 degrees with respect to each other.

Provided next is a first adhesive 72. The first adhesive couples together the first balls of the first, second and third elongated members. In this manner each first ball contacts the other first balls.

A second adhesive 76 is provided. The second adhesive couples together the second balls of the first, second and third elongated members. In this manner each second ball contacts the other second balls. The system is preferably configured whereby the tufts of bristles of the various support members are in contact with each other and adjacent to the ends of the support members but spaced from each other adjacent to the central extents of the support members.

Further provided is a plurality of generally hemispherical projections 80. The projections are on the exterior face of the supporting member. The projections are also on the balls to massage the gums of a dog chewing on the system.

Provided last is a dentifrice 84. He dentifrice is preferably an enzymatic toothpaste. The dentifrice is provided on the outer ends of the bristles. In this manner the dental cleansing action is enhanced on teeth of a dog chewing, with a brushing motion, on the system.

The present invention may also be considered as a method. Such method involves a dog toy and toothbrush method. The method includes the step of providing a plurality of elongated support members, each curved in an arcuate configuration to form an interior concave face and an exterior convex face, each support member having a first end and a second end and with a central extent there between. The method also includes the step of coupling together the first ends of the support members and the second ends of the support members. The method also includes the step of providing a plurality of bristles, the bristles having interior ends on the central extent of the support members, the bristles having free exterior ends. The method also includes the step of adding a dentifrice on the exterior ends of the bristles to enhance the dental cleansing action on the teeth of a dog chewing on the system. The method also includes the step of chewing on the support members and bristles and dentifrice whereby a dog will be entertained since the support members and bristles look like a toy which looks like a bone and whereby a dog will concurrently have its teeth and gums brushed and massaged by the bristles and dentifrice.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dog toy and toothbrush system for providing dental hygiene as well as concurrent entertainment to a dog comprising, in combination:

a first elongated support member fabricated of an essentially rigid polymeric material, the first support member being of a long and thin shape curved in an arcuate configuration to form an interior concave face and an exterior convex face, the first support member residing in a first plane, the first support member having a first end and a second end with a central extent there between, the first support member also having a first ball at the first end and second ball at the second end, each of the balls having a diameter greater than the largest cross sectional dimension of the first support member, the first support member having a plurality of tufts of bristles, each tuft having an inner end coupled to the first support member and an outer end extending away from the first support member;

a second elongated support member fabricated of an essentially rigid polymeric material, the second support member being of a long and thin shape curved in an arcuate configuration to form an interior concave face and an exterior convex face, the second support member residing in a second plane, the second support member having a first end and a second end with a central extent there between, the second support member also having a first ball at the first end and second ball at the second end, each of the balls having a diameter greater than the largest cross sectional dimension of the second support member, the second support member having a plurality of tufts of bristles, each tuft having an inner end coupled to the second support member and an outer end extending away from the second support member;

a third elongated support member fabricated of an essentially rigid polymeric material, the third support member being of a long and thin shape curved in an arcuate configuration to form an interior concave face and an exterior convex face, the second support member residing in a third plane, the third support member having a first end and a second end with a central extent there between, the third support member also having a first ball at the first end and second ball at the second end, each of the balls having a diameter greater than the largest cross sectional dimension of the second support member, the third support member having a plurality of tufts of bristles, each tuft having an inner end coupled to the third strip and an outer end extending away from the third support member;

a plurality of generally hemispherical projections on the exterior face of the supporting member and on the balls to massage the gums of a dog chewing on the system; and a dentifrice on the outer ends of the bristles to enhance the dental cleansing action on teeth of a dog chewing on the system.

2. A dog toy and toothbrush system comprising:

a plurality of elongated support members being curved in an arcuate configuration to form an interior concave face and an exterior convex face, each support member residing in a plane with a first end and a second end and with a central extent there between and with a plurality of bristles; and the first ends of the support members being coupled together and the second ends of the support members being coupled together.

3. The system as set forth in claim 2 wherein there are three support members each in a plane different than the other support members, the planes being at about 120 degrees with respect to each other.

4. The system as set forth in claim 2 wherein the tufts of bristles of the various support members are in contact with each other adjacent to the ends of the support members but spaced from each other adjacent to the central extents of the support members.

5. The system as set forth in claim 2 and further including:

a plurality of generally hemispherical projections on the exterior face of the supporting member and on the balls to massage the gums of a dog chewing on the system.

6. The system as set forth in claim 2 and further including:

a dentifrice on the outer ends of the bristles to enhance the dental cleansing action on the teeth of a dog chewing on the system.

7. A dog toy and toothbrush method comprising:

providing a plurality of elongated support members, each curved in an arcuate configuration to form an interior concave face and an exterior convex face, each support member having a first end and a second end and with a central extent there between;

coupling together the first ends of the support members and the second ends of the support members;

providing a plurality of bristles, the bristles having interior ends on the central extent of the support members, the bristles having free exterior ends;

adding a dentifrice on the exterior ends of the bristles to enhance the dental cleansing action on the teeth of a dog chewing on the system; and chewing on the support members and bristles and dentifrice whereby a dog will be entertained since the support members and bristles look like a toy which looks like a bone and whereby a dog will concurrently have its teeth and gums brushed and massaged by the bristles and dentifrice.

* * * * *